July 16, 1929.  G. M. FLOWERS  1,721,108
DEVICE FOR PREVENTING TRAIN WRECKS
Filed Dec. 31, 1928  2 Sheets-Sheet 1
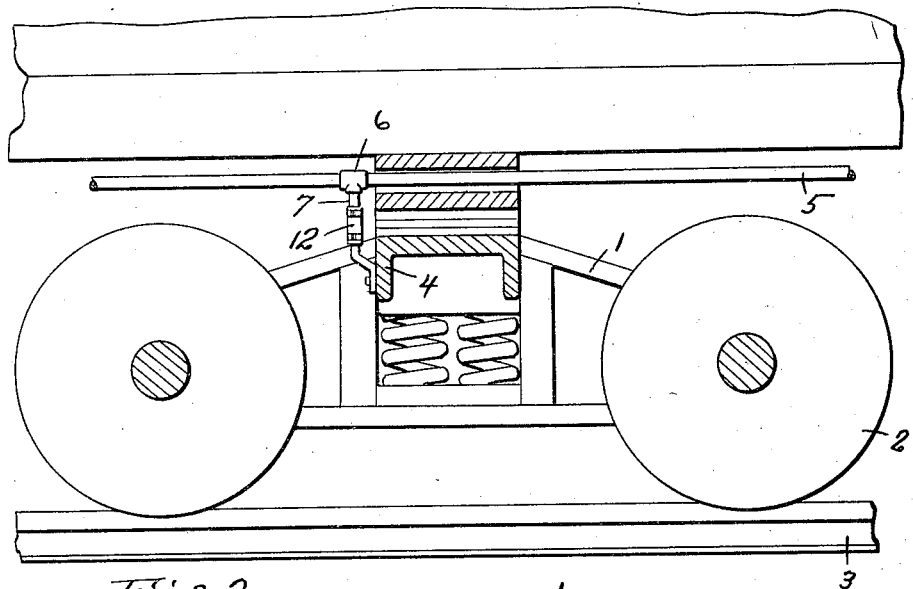
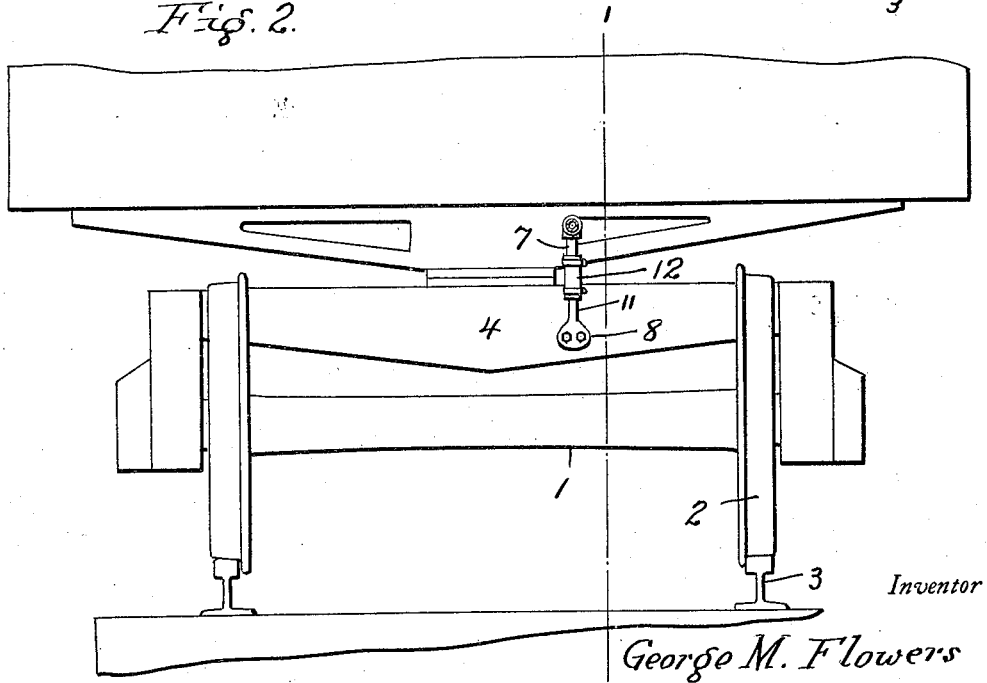
Inventor
George M. Flowers
By Clarence A. O'Brien
Attorney

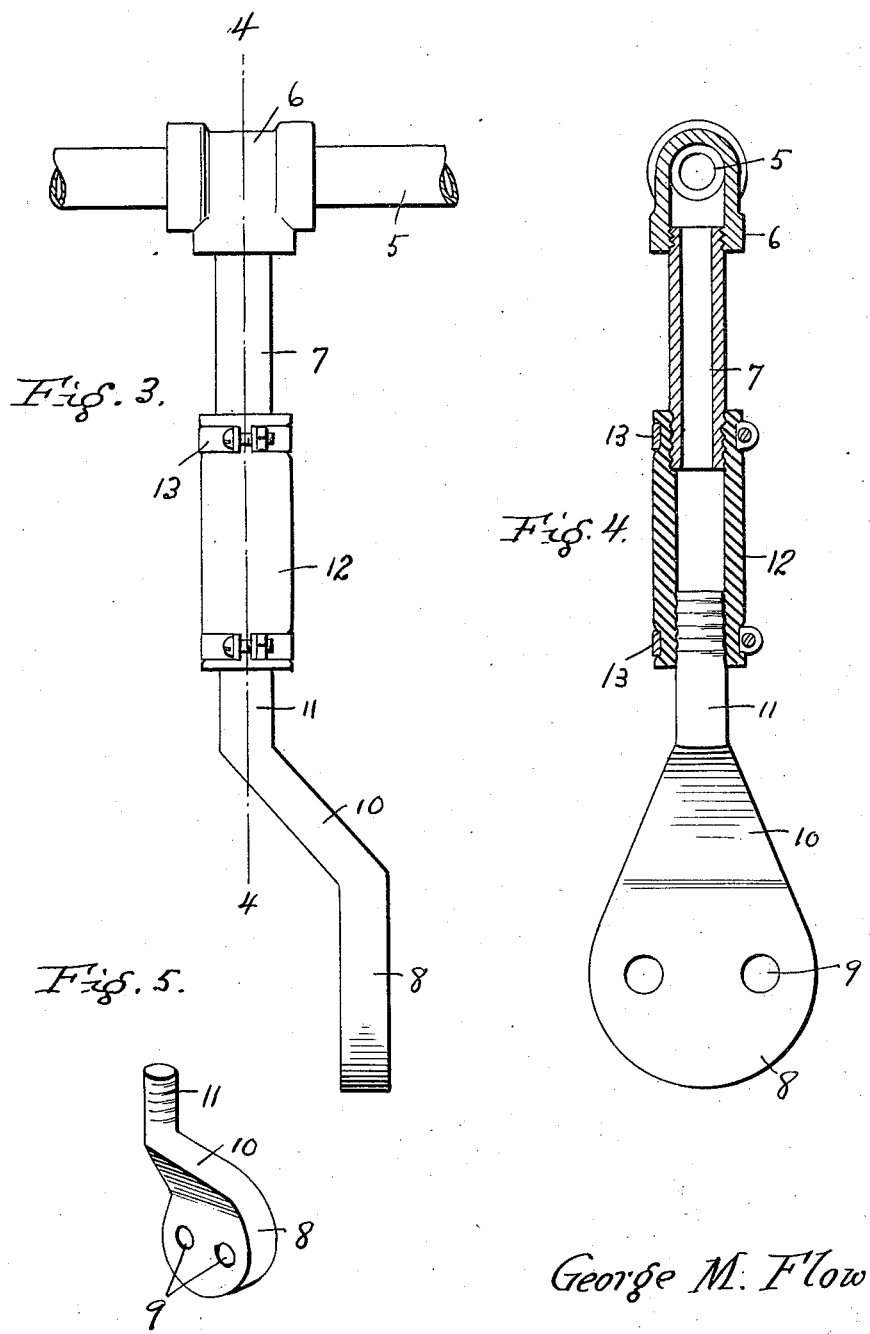

Patented July 16, 1929.

1,721,108

UNITED STATES PATENT OFFICE.

GEORGE MONROE FLOWERS, OF HICKORY, NORTH CAROLINA.

DEVICE FOR PREVENTING TRAIN WRECKS.

Application filed December 31, 1928. Serial No. 329,400.

The present invention relates to improvements in devices for preventing train wrecks when one of the trucks becomes derailed from the tracks through any cause, the invention aiming to instantly effect the application of the air brakes.

Another important object of the invention is to provide a device of the above mentioned character for association with the air line system, said device normally preventing the air line from being bled, the device being attached to the truck in such a manner that when the wheels of the truck become derailed, the device will automatically bleed the air line and apply the air brakes on the whole train immediately.

Still a further object is to provide a device of the above mentioned character that can be readily and easily installed without necessitating any material alterations, the same being at all times positive and efficient, as well as automatic in its operation.

A further object is to provide a wreck preventing device of the above mentioned character which is simple in construction, inexpensive, strong and durable, and further well adapted to the purpose for which it is designed.

Other objects and advantages of the invention will become apparent from the following description when taken in connection with the accompanying drawings.

In the accompanying drawings wherein like reference characters indicate corresponding parts throughout the same:

Figure 1 is a side elevation of a truck associated with a railway car, parts of the truck being shown in section and showing my improved device attached to the truck and connected to the air line of the train.

Figure 2 is an end elevation of the truck showing my device mounted thereon and connected with the air line.

Figure 3 is a detail view of the device per se as associated with the air line.

Figure 4 is a sectional view taken approximately on the line 4—4 of Figure 3, and Figure 5 is a detail perspective view of the lug forming an important part of the present invention.

In the drawings wherein for the purpose of illustration is shown the preferred embodiment of my invention, the numeral 1 designates generally the truck of a railway car, the wheels of the truck being indicated at 2, and the tracks on which the wheels travel are shown at 3. The cross beam of the truck is shown at 4, and the air line that extends longitudinally along the bottom of the railway car is indicated at 5.

In the application of the present invention, a T-shaped fitting 6 is interposed in the air line 5 adjacent the cross beam 4, and a nipple 7 is attached at its upper end to the leg portion of the T-shaped fitting or coupling 6. My device includes an iron lug 8 that is fixedly secured on the side of the cross beam 4 by any appropriate fastening means that extends through openings 9 provided therefor in the lug. As is clearly indicated in Figures 4 and 5, this lug tapers gradually toward its upper end and the upper portion thereof is offset as indicated at 10. An upwardly extending stem 11 is formed on the offset portion 10 of the lug and the upper end of this stem is threaded into the lower end of a rubber hose 12, the lower end of the nipple 7 being similarly secured in the upper end of this short piece of hose. In addition, suitable clamps 13 extend around the respective end portions of the rubber hose to further clamp the same on the adjacent ends of the nipple 7 and the stem 11.

This stem 11 provides a closure for the lower end of the hose 12 so that normally the air will pass through the air line 5 without being bled. However, should any of the wheels 2 of the truck 1 become derailed from the tracks 3, this will result in a twist of the truck including the cross beam 4, and as a result, the stem 11 will be forcibly disengaged from the lower end of the hose 12 and the lower end of the hose will then be open causing a bleeding of the air line whereupon the brakes of the whole train will be immediately applied so that a wreck will be prevented.

It will thus be seen from the foregoing description that I have provided a device for association with the air line system of a train that will at all times be positive and efficient, as well as automatic in effecting the application of the air brakes should the wheels of the truck become accidentally derailed.

Furthermore the construction of my device is of such a nature as to permit the installation thereof on a train without necessitating any material alterations.

While I have shown the preferred embodiment of my invention it is to be understood that minor changes in the size, shape and arrangement of parts may be resorted to without departing from the spirit of the invention and the scope of the appended claims.

Having thus described the invention, what I claim as new and desire to secure by Letters Patent is:—

1. In combination with a railway car supporting truck, and the air line for the car, of a fitting arranged in the air line, a nipple depending from the fitting and communicating with the air line, a hose attached at its upper end on the lower end of the nipple, and means carried by the cross beam of the truck and normally fitting in the lower end of the hose to provide a closure therefor, said means being automatically disengaged from the hose to bleed the air line when the wheels of the truck become accidentally derailed, said means comprising a lug secured on the side of the cross beam, the upper portion of the lug being offset and an upwardly extending stem formed on the upper portion of the offset portion of the lug, the upper end of the stem fitting in the lower end of the hose.

2. In combination with a railway car supporting truck, and the air line for the car, of a fitting arranged in the air line, a nipple depending from the fitting and communicating with the air line, a hose attached at its upper end on the lower end of the nipple, and means carried by the cross beam of the truck and normally fitting in the lower end of the hose to provide a closure therefor, said means being automatically disengaged from the hose to bleed the air line when the wheels of the truck become accidentally derailed, said means comprising a lug secured on the side of the cross beam, the upper portion of the lug being offset, and an upwardly extending stem formed on the upper portion of the offset portion of the lug, the upper end of the stem fitting in the lower end of the hose, and clamps encircling the upper and lower end portions of the hose.

3. In combination with a railway car supporting truck and the air line for the car, of a fitting arranged in the air line adjacent the cross beam of the truck, a nipple depending from the fitting along the adjacent side of the truck and having communication with the air line, a hose attached at its upper end on the lower end of the nipple, and means carried by the cross beam of the truck for normally fitting in the lower end of the hose to provide a closure therefor, said means being automatically disengaged from the hose to bleed the air line when the wheels of the truck become accidentally derailed, said means comprising a lug fixedly secured on the aforementioned side of the cross beam, and an upwardly extending stem carried by the lug and disposed in alignment with said nipple, the upper end of the stem being fitted in the lower end of the hose.

In testimony whereof I affix my signature.

GEORGE MONROE FLOWERS.